(12) United States Patent
Bhandare et al.

(10) Patent No.: US 9,494,810 B2
(45) Date of Patent: Nov. 15, 2016

(54) AUTOMATIC BIAS STABILIZATION OF DUAL-POLARIZATION IN-PHASE AND QUADRATURE OPTICAL MODULATOR

(71) Applicant: Finisar Corporation, Sunnyvale, CA (US)

(72) Inventors: Suhas P. Bhandare, Levittown, PA (US);

(Continued)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/079,859

(22) Filed: Mar. 24, 2016

(65) Prior Publication Data

US 2016/0282638 A1    Sep. 29, 2016

Related U.S. Application Data

(60) Provisional application No. 62/137,804, filed on Mar. 24, 2015.

(51) Int. Cl.
     *G02F 1/035*      (2006.01)
     *G02F 1/01*      (2006.01)
     (Continued)

(52) U.S. Cl.
     CPC .............. *G02F 1/0123* (2013.01); *G01J 4/00* (2013.01); *G02F 1/2257* (2013.01);
     (Continued)

(58) Field of Classification Search
     CPC ................ H04B 10/50575; H04B 10/50577; H04B 10/532; H04B 10/548; G02F
     (Continued)

(56) References Cited

U.S. PATENT DOCUMENTS 8,948,609 B2 * 2/2015 Whiteaway ........... H04L 27/364
                                                                    398/182
9,059,805 B2 * 6/2015 Mak .................... H04B 10/5055
(Continued)

OTHER PUBLICATIONS

Tunable InP-based Optical IQ Modulator for 160 Gb/s by Prosyk et al; ECOC Postdeadline Papers © 2011 OSA.*

*Primary Examiner* — Ryan Lepisto
*Assistant Examiner* — Guy Anderson
(74) *Attorney, Agent, or Firm* — Maschoff Brenan

(57) ABSTRACT

Embodiments include a method and apparatus used for automatic bias stabilization of a DP IQM based on MZM for transmitting DP-QPSK optical data and/or DP-16QAM optical data. The apparatus simultaneously dithers DC-bias voltages of in-phase child, quadrature-phase child, and parent MZMs with three different dither patterns in time-domain which are mutually orthogonal to each other in the frequency-domain for X and Y polarization IQ modulators. Tap monitor photodiodes detect an interference term between these three dither patterns for each polarization. The interference term is sampled using an ADC in the time domain. The time-synchronous detection method may solve a set of three simultaneous linear partial differential equations with three unknowns to compute controlled DC-bias voltages to set on the respective MZM with a solution set which may iteratively converge to a unique solution, thereby biasing the child MZM in dual-polarization IQM to transmission minimum and parent MZM in quadrature transmission.

20 Claims, 5 Drawing Sheets

(72) Inventors: Mark Colyar, New Hope, PA (US);
David Meloche, Upper Black Eddy, PA (US); Terence D. Grenda, Perkasie, PA (US); Chris Stook, Horsham, PA (US); Heider N. Ereifej, Chalfont, PA (US); John DeAndrea, New Hope, PA (US)

(51) Int. Cl.
| | | |
|---|---|---|
| *G01J 4/00* | (2006.01) | |
| *G02F 1/225* | (2006.01) | |
| *G02F 1/21* | (2006.01) | |
| *H04B 10/50* | (2013.01) | |
| *H04B 10/532* | (2013.01) | |
| *H04B 10/548* | (2013.01) | |

(52) U.S. Cl.
CPC ... *G02F 2001/212* (2013.01); *H04B 10/50575* (2013.01); *H04B 10/50577* (2013.01); *H04B 10/532* (2013.01); *H04B 10/548* (2013.01)

(58) Field of Classification Search
CPC ............ 1/0123;G02F 1/2257; G02F 2001/212; G01J 4/00
USPC ......... 385/2–3; 359/237, 245–246, 248, 251, 359/254, 255–256, 278–279, 300
See application file for complete search history.

(56) References Cited

U.S. PATENT DOCUMENTS

| | | | |
|---|---|---|---|
| 9,124,364 | B1* | 9/2015 | Sotoodeh .......... H04B 10/50577 |
| 9,281,898 | B2* | 3/2016 | Guo ................... H04B 10/5053 |
| 9,294,200 | B2* | 3/2016 | Mak ................... H04B 10/5055 |
| 9,312,961 | B2* | 4/2016 | Le Taillandier De Gabory ................ H04B 10/541 |
| 2014/0308047 | A1* | 10/2014 | Mak ................... H04B 10/5055 398/182 |
| 2015/0236790 | A1* | 8/2015 | Guo ................... H04B 10/5053 398/25 |
| 2015/0244468 | A1* | 8/2015 | Mak ................... H04B 10/5055 398/184 |

* cited by examiner $$XAVE_{ave} = \frac{1}{24} \cdot \left( \sum_{n=t-26}^{t-19} XAVE_n + \sum_{n=t-17}^{t-10} XAVE_n + \sum_{n=t-8}^{t-1} XAVE_n \right)$$

$$YAVE_{ave} = \frac{1}{24} \cdot \left( \sum_{n=t-53}^{t-46} YAVE_n + \sum_{n=t-44}^{t-37} YAVE_n + \sum_{n=t-35}^{t-28} YAVE_n \right)$$

$$Ycorrection = \frac{XAVE_{ave}}{YAVE_{ave}}$$

$$Xcorrection = \frac{YAVE_{ave}}{XAVE_{ave}}$$

Compute for t = 9, 18, 27

$$\frac{\partial XAVE}{\partial XI} = \sum_{n=t-8}^{t-1} XIdither_{n-1} \cdot (XAVE_n - YAVE_n \cdot Ycorrection)$$

$$\frac{\partial XAVE}{\partial XQ} = \sum_{n=t-8}^{t-1} XQdither_{n-1} \cdot (XAVE_n - YAVE_n \cdot Ycorrection)$$

$$\frac{\partial XAVE}{\partial XP} = \sum_{n=t-8}^{t-1} XPdither_{n-1} \cdot (XAVE_n - YAVE_n \cdot Ycorrection)$$

XI error

XQ error

XP error from XAVE $$\frac{\partial^2 XAVE}{\partial XQ \cdot \partial XP} = \frac{\partial XAVE}{\partial XQ} \cdot \frac{\partial XAVE}{\partial XP}$$

$$\frac{\partial^2 XAVE}{\partial XI \cdot \partial XP} = \frac{\partial XAVE}{\partial XI} \cdot \frac{\partial XAVE}{\partial XP}$$

$$\frac{\partial^2 XAVE}{\partial XI \cdot \partial XQ} = \frac{\partial XAVE}{\partial XI} \cdot \frac{\partial XAVE}{\partial XQ}$$

Compute for t = 36, 45, 54

$$\frac{\partial YAVE}{\partial YI} = \sum_{n=t-8}^{t-1} YIdither_{n-1} \cdot (YAVE_n - XAVE_n \cdot Xcorrection)$$

$$\frac{\partial YAVE}{\partial YQ} = \sum_{n=t-8}^{t-1} YQdither_{n-1} \cdot (YAVE_n - XAVE_n \cdot Xcorrection)$$

$$\frac{\partial YAVE}{\partial YP} = \sum_{n=t-8}^{t-1} YPdither_{n-1} \cdot (YAVE_n - XAVE_n \cdot Xcorrection)$$

YI error

YQ error

YP error from YAVE $$\frac{\partial^2 YAVE}{\partial YQ \cdot \partial YP} = \frac{\partial YAVE}{\partial YQ} \cdot \frac{\partial YAVE}{\partial YP}$$

$$\frac{\partial^2 YAVE}{\partial YI \cdot \partial YP} = \frac{\partial YAVE}{\partial YI} \cdot \frac{\partial YAVE}{\partial YP}$$

$$\frac{\partial^2 YAVE}{\partial YI \cdot \partial YQ} = \frac{\partial YAVE}{\partial YI} \cdot \frac{\partial YAVE}{\partial YQ}$$

FIG. 3

AUTOMATIC BIAS STABILIZATION OF DUAL-POLARIZATION IN-PHASE AND QUADRATURE OPTICAL MODULATOR

FIELD

This application claims the benefit of and priority to U.S. Provisional Application No. 62/137,804, filed Mar. 24, 2015, which is incorporated herein by reference.

FIELD

Some embodiments described herein generally relate to automatic bias stabilization of a dual-polarization in-phase and quadrature phase optical modulator (IQM).

BACKGROUND

Unless otherwise indicated herein, the materials described herein are not prior art to the claims in the present application and are not admitted to be prior art by inclusion in this section.

An optics transceiver with a small form factor may have a limited space. In some applications, it may be difficult to enclose various components into the optics transceiver due to the limited space available in the transceiver.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein include an apparatus and a method for an automatic bias stabilization of a dual-polarization IQM. A pre-requisite is to have a method and apparatus that can be implemented for Mach-Zehnder (MZ) optical modulators used in coherent transceiver modules that transmit high-order modulation formats (e.g., DP-QPSK, DP-16QAM, DP-8QAM as examples). The hardware to implement some embodiments described herein may be minimized or at least reduced compared to other designs and hence may allow integration of MZ optical modulators (MZMs) in compact form factors like CFP/CFP2/CFP4 real estate, or other small-and/or compact-form factor pluggable optical transceiver form factors.

Embodiments described herein may include one or more of:

I. A time-domain method that simultaneously dithers DC-biases of a dual-polarization IQM.
II. A detection method implemented in any of a variety of small/compact form factor pluggable optical transceivers (CFP, CFP2 CFP4, QSP28 etc. . . . ) for an automatic bias stabilization which solves three simultaneous linear partial-differential equations with three unknowns and biases I-child and Q-child MZMs to a minimum (or at least reduced) transmission and parent MZM to a quadrature transmission.
III. Use of a set of three dither patterns in time-domain that are mutually orthogonal in the frequency-domain using a 16-bit digital-to-analog converter (DAC).
IV. Detecting interference terms between a set of three mutually orthogonal dither patterns from one or more tap monitor photodiodes connected to respective outputs of X-Pol. and Y-Pol. parent MZM outputs.
V. Detected interference terms are sampled in time-domain using a 24-bit delta-sigma analog-to-digital converter (ADC) sampling at very low sampling frequency.
VI. Simultaneous or substantially simultaneous calculation of three error signals using time-synchronous detection method and interference terms due to dither patterns mentioned in point III above, detected using as described in point IV above, and sampled as described in point V above.
VII. A digital proportional and integral controller computes the respective DC bias set points of the I-child-, Q-child-, and parent-MZM for X-Pol. and Y-Pol. In-phase and quadrature optical modulators (IQMs) using error computed in (VI).
VIII. Simultaneous update of the calculated DC-bias voltage from (VII) to respective digital-to-analog converter that biases the respective I-child-, Q-child-, and parent-MZM for X-Pol. and Y-Pol. IQMs Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 shows equations that may be used to compute respective errors using time-synchronous detection;

DETAILED DESCRIPTION OF SOME EXAMPLE EMBODIMENTS

Particular embodiments of the present disclosure will be described with reference to the accompanying drawings.

The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of configurations, all of which are explicitly contemplated herein.

This patent application describes a method and apparatus used for automatic bias stabilization of a dual-polarization IQM based on MZM technology for transmitting 100 gigabits per second (Gb/s) DP-QPSK optical data and 200-Gb/s DP-16QAM optical data in long-haul and metro networks in about ½ of the C-form factor pluggable (CFP2) unit. In other embodiments, other symbol rates and/or other modulation formats may be implemented in apparatuses of other sizes. The apparatus simultaneously dithers DC-bias voltages of the in-phase child-, quadrature-child-, and parent-MZM with three different sets of dither patterns in the time-domain and which are mutually orthogonal to each other in the frequency-domain for X and Y polarization IQ modulators using a 16-bit successive approximation register based DAC. Two 5% tap monitor photodiodes connected to the respective outputs of the X-Pol. and Y-Pol. IQMs may detect the interference between the set of three different dither patterns. The respective interference terms may be sampled in the time domain using a two channel 24-bit delta-sigma ADC sampling at only 10 Hz or other suitable sample rate to get to the best or at least suitable signal-to-noise ratio. The method may simultaneously compute three respective error signals for X-Pol. and Y-Pol. IQMs using time-synchronous detection. The respective error signals may then be passed through a proportional integral controller. The controlled outputs may then be sent to respective DACs that simultaneously update the DC bias voltage of the respective I-child, Q-child, and parent MZM for X-Pol. and Y-Pol., respectively. The method, in principle, may solve three linear simultaneous partial-differential equations with three unknowns in time-domain for X-Pol. and Y-Pol., respectively, for which there may be only one stable solution which corresponds to biasing the I-child and Q-child MZM to minimum transmission and parent-MZM biased to quadrature transmission.

Figure 1:
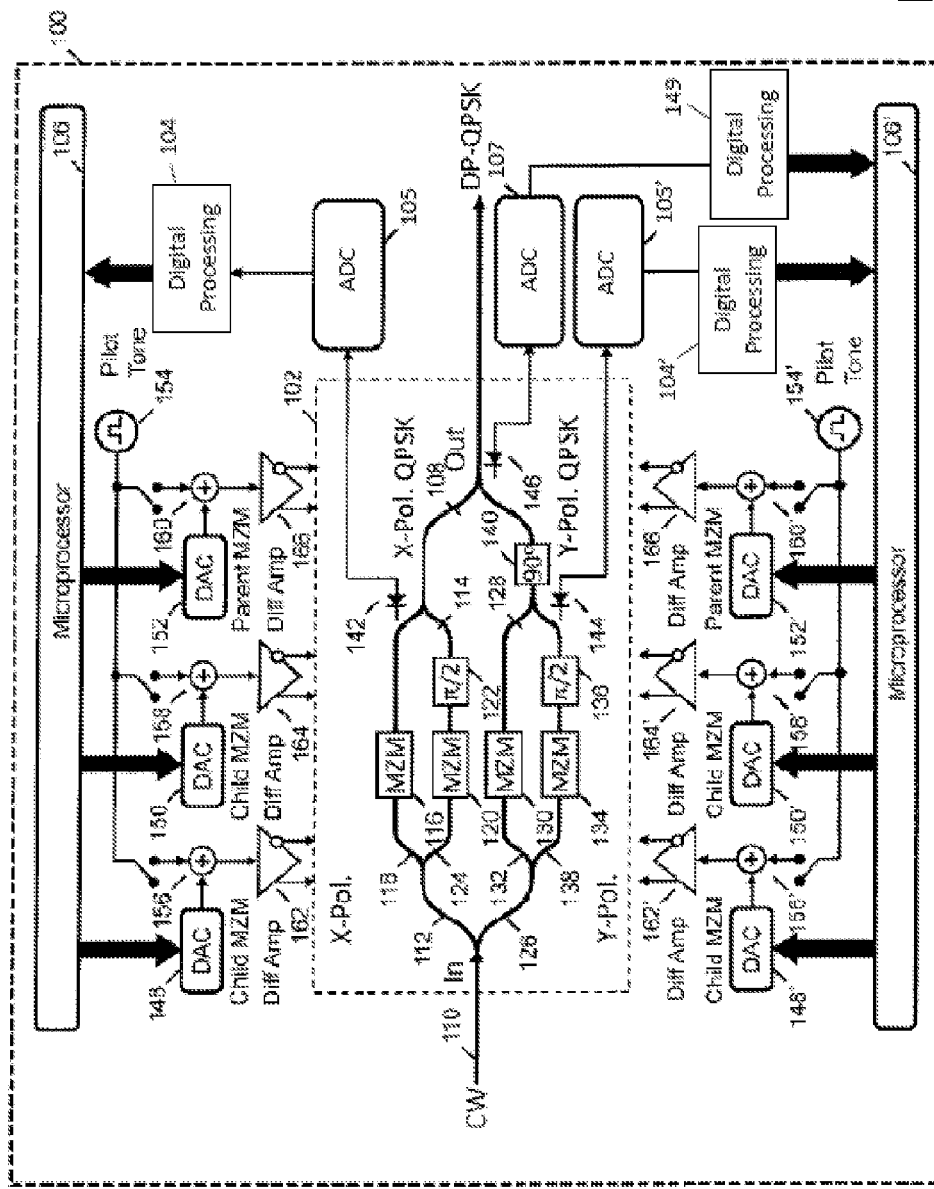
FIG. 1 shows a block of diagram of an example dual-polarization IQM in which embodiments described herein may be implemented.

FIG. 1 illustrates a block diagram of an example DP-QPSK optical transmitter 100, arranged in accordance with at least one embodiment described herein. The DP-QPSK optical transmitter 100 includes an IQM modulator 102 and associated hardware that differentially drives the IQM modulator 102 components under microprocessor control. Many aspects of the DP-QPSK optical transmitter 100 is described in connection with the D-QPSK modulation format. However, one skilled in the art will appreciate that the transmitter and methods of transmitting described herein can be used with numerous other types of modulator formats, such as BPSK, m-ary QAM, m-ary PSK, OFDM, and any dual-polarization variant of these modulations forms. In addition, some aspects of the DP-QPSK optical transmitter 100 are described in connection with MZMs and more particularly described in connection with lithium niobate-based MZMs.

Lithium niobate-based MZMs have certain suitable features for high data rate transmitters, such as being stable against numerous types of environmental variations so that they can generate very reliable and repeatable high data rate transmissions at 100 Gb/s and higher. In particular, lithium niobate-based MZMs can have highly stable operation under large operating temperature variations. In some embodiments, DP-QPSK lithium niobate optical modulators as described herein may be stabilized using various lock-in techniques, which can be performed automatically under microprocessor control. Digital signal processors 104, 104' and microprocessors 106, 106' are used to determine the various operating points of the parent and child MZMs.

The DP-QPSK optical transmitter 100 includes an outer MZM 108 that includes an optical input 110 that receives an optical beam from a laser source. In many embodiments, the laser source is a tunable laser source. A first arm of the outer MZM 112 includes a first parent MZM 114. The first parent MZM 114 includes a first child MZM 116 that is optically coupled into a first arm 118. A second child MZM 120 is optically coupled to a $\pi/2$ optical phase shifter 122 and optically coupled into a second arm 124. The first parent MZM 114 modulates a QPSK signal with a first polarization, referred to hereinafter as the first polarization QPSK signal.

A second arm 126 of the outer MZM 108 includes a second parent MZM 128 that includes a first child MZM 130 optically coupled into a first arm 132. A second child MZM 134 is optically coupled to a $\pi/2$ optical phase shifter 136 and optically coupled into a second arm 138. An optical polarization rotator 140 is also optically coupled into the second arm 126 of the outer MZM 108. In some embodiments, the optical polarization rotator 140 is a fixed $\pi/2$ polarization rotator. In other embodiments, the optical polarization rotator 140 is a variable polarization rotator. The second parent MZM 128 modulates a QPSK signal with a second polarization, referred to hereinafter as the second polarization QPSK signal. The outer MZM 108 multiplexes the first and second polarization QPSK signals together into a dual-polarization QPSK signal.

In an example embodiment, the first and second parent MZMs 114, 128 and each of the first and second child MZMs 116, 120, 130, and 134 are all lithium niobate based MZMs. In this embodiment, the four individual child Mach-Zehnder modulators 116, 120, 130, and 134 may be driven by an electrical NRZ signal with a peak-to-peak voltage swing of $2V\pi$ and biased at a point of minimum transmission to generate four PSK signals. In other embodiments, some of these modulators are other types of MZMs such as III-V or II-V semiconductor MZMs.

A first optical detector 142 is optically coupled to an output of the first parent MZM 114. The first optical detector 142 detects the first polarization QPSK signal generated by the first parent MZM 114. A second optical detector 144 is optically coupled to an output of the second parent MZM 128. The second optical detector 144 detects the second polarization QPSK signal generated by the second parent MZM 128. The first and second optical detectors 142, 144 may include tap monitor photodiodes and/or can be any type of optical detectors as long as the detectors have a suitable optical-to-electrical conversion bandwidths. For example, the first and second optical detectors 142, 144 can be PIN photodetectors with an optical-electrical bandwidth of a least 1 GHz and with an optical-electrical coupling efficiency of at least 0.05%. In some embodiments, a third photodetector 146 can be optically coupled to an output of the IQM modulator 102. The additional third photodetector 146 may be used to lock-in stabilize the variable polarization rotator 140 used to generate the dual-polarization signal. Thus, one feature of some optical transmitter described herein may include the direct/indirect detection of AC terms using photodetectors that may be built into the optical modulators.

One aspect of the present disclosure may include the hardware and software that together implement various digital processors and digital controllers that are used to stabilize and track various operating points of the IQM modulator 102. The various digital processors and controllers can be pure integral controllers or can be proportional-integral controllers. These controllers are feedback controllers which calculate an "error" value as the difference between a measured process variable and a desired set point. The controllers attempt to minimize the error by adjusting the process control inputs. Proportional-integral controllers can operate in a proportional mode, an integral mode, or a proportional-integral mode.

A bias control circuit implemented in the IQM optical modulator 102 includes the digital signal processors 104, 104' and the microprocessors 106, 106' for each polarization. In this embodiment, two microprocessors 106, 106' are used for control. However, in other embodiments, only one microprocessor can be used. ADCs 105, 105' are electrically connected to outputs of the first and second photodetectors 142, 144, respectively, and convert the output signals from the first and second photodetectors 142, 144 to digital signals that can be processed by the digital signal processors 104, 104'. The digital signal processors 104, 104' are each coupled between a respective one of the ADCs 105, 105' and a respective one of the microprocessors 106, 106'. The microprocessors 106, 106' each have three digital outputs that are electrically connected to DACs 148, 148', 150, 150', 152, 152'.

Outputs of the DACs 148, 148', 150, 150', 152, 152' are coupled to inputs of respective adder circuits 156, 156', 158, 158', 160, 160'. Output of pilot tone generators 154, 154' that generate pilot tone signals are electrically connected to other inputs of the adder circuits 156, 156', 158, 158', 160, 160'. Outputs of the adder circuits 156, 156', 158, 158', 160, 160' are electrically connected to respective inputs of differential amplifiers 162, 162', 164, 164', 166, 166'. Each of the differential amplifiers 162, 162', 164, 164', 166, 166' includes an output and inverse output that are electrically connected to bias inputs of a respective child or parent MZMs as shown in FIG. 1. That is, each child and parent MZM is biased by an output and an inverse output of a respective differential amplifier to increase the output voltage swing in order to satisfy end-of-life drive voltage requirement.

More generally, the bias control circuit including the digital signal processors 104, 104' and the microprocessors 106, 106' has a first and second input electrically connected to respective outputs of the first and second optical detectors 142, 144. A first and second output are electrically coupled to respective bias inputs of the first and second child MZM 116, 120 of the first parent MZM 114. A third output is electrically coupled to a phase bias input of the first parent MZM 114. A fourth and fifth output are electrically coupled to respective bias inputs of the first and second child MZMs 130, 134 of the second parent MZM 128. A sixth output is electrically coupled to a phase bias input of the second parent MZM 128. In embodiments that include the third photodetector 146 optically coupled to an output of the outer MZM 108, an output of the third optical detector 146 is electrically connected to ADC 107 which in turn is connected to an input of a bias control circuit 149.

The bias control circuit may include the ADCs 105, 105', 107 that convert AC electrical signals generated by the first, second, and third optical detectors 142, 144, 146 in response to modulated data to digital data. The bias control circuit can include the digital processors 104, 104' and/or microprocessors 106, 106' that calculate errors signals using the time-synchronous detection method described herein and interference terms due to dither patterns. The microprocessors 106, 106' or other digital processor(s) acquire signals, e.g., the error signals, to determine DC-bias set points of each child and parent MZM to stabilize the optical transmitter.

For DP-QPSK operation, the first and second parent MZMs 114, 128 are biased at quadrature to establish a $\pi/2$ phase shift between signals generated by the corresponding child MZMs 116 and 120, 130 and 134 so that the first parent MZM 114 generates the first polarization QPSK signal and the second parent MZM 128 generates the second polarization QPSK signal.

The bias control signals also stabilize the generated DP-QPSK signal in response to signals generated by the first, second, and third optical detectors 142, 144, and 146. In various modes of operation, the bias control circuit generates electrical signals that stabilize the first and second parent MZMs 114, 128 to a quadrature point or to a minimum transmission point that minimizes DC and AC signals detected by the first, second, and third optical detectors 142, 144, and 146.

The optical modulator structure in the transmitter 100 of FIG. 1 may be sensitive to the various operating bias points of the two parent MZMs 114, 128 and the four child MZMs 116, 120, 130, 134 and these operating bias points may be sensitive to environmental variations such as temperature. To build a reliable optical transmitter that operates at 100 Gb/s and above data rates that is stable against temperature, may usually require an automatic modulator bias control circuit that is controlled by a microprocessor as described herein.

Figure 2:
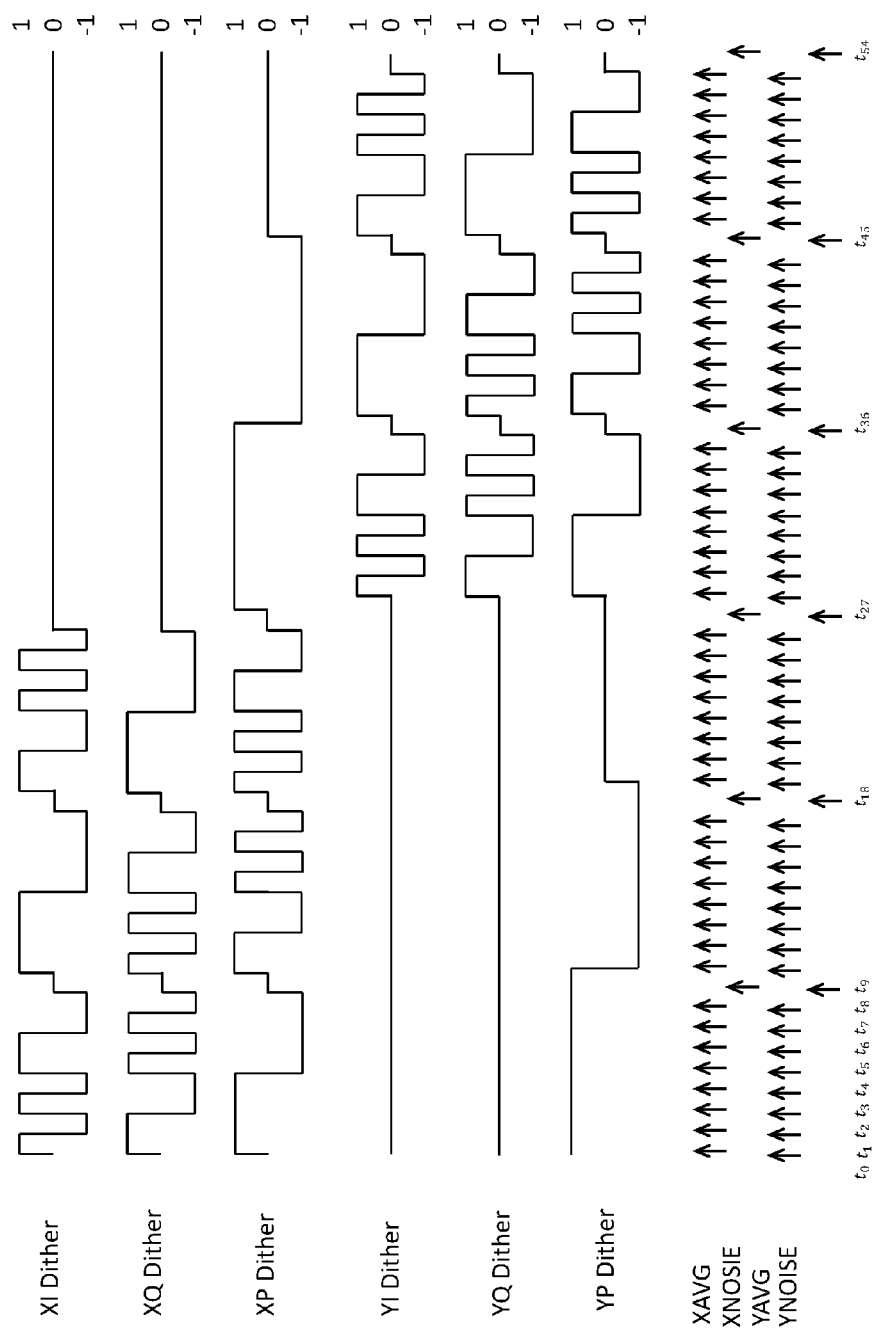
FIG. 2 shows example dither patterns and their sampling intervals that may be implemented in the dual-polarization IQM of FIG. 1.

FIG. 2 shows example dither patterns and their sampling intervals that may be implemented in the dual-polarization IQM 102 of FIG. 1, arranged in accordance with at least one embodiment described herein. The dither patterns include three first dither patterns for the x polarization (labeled "XI Dither", "XQ Dither", and "XP Dither") and three second dither patterns for the y polarization (labeled "YI Dither", "YQ Dither", and "YP Dither"). The three first dither patterns include a first in-phase dither pattern (labeled "XI Dither"), a first quadrature dither pattern (labeled "XQ Dither"), and a first parent dither parent (labeled "XP Dither"). The three second dither patterns include a second in-phase dither pattern (labeled "YI Dither"), a second quadrature dither pattern (labeled "YQ Dither"), and a second parent dither parent (labeled "YP Dither"). In some embodiments, a first-in-time half and a second-in-time half of the first in-phase dither pattern are respectively identical to a second-in-time half and a first-in-time half of the second in-phase dither pattern. Alternately or additionally, a first-in-time half and a second-in-time half of the first quadrature dither pattern are respectively identical to a second-in-time half and a first-in-time half of the second quadrature dither pattern. Alternately or additionally, a first-in-time half and a second-in-time half of the first parent dither pattern are respectively identical to a second-in-time half and a first-in-time half of the second parent dither pattern.

The three first dither patterns for the x polarization may be mutually orthogonal in the frequency domain. The three second dither patterns for the y polarization may alternatively or additionally be mutually orthogonal in the frequency domain.

FIG. 3 shows example equations used to compute respective errors using time-synchronous detection, arranged in accordance with at least one embodiment described herein. According to the equations of FIG. 3, the IQM may, e.g., simultaneously calculate three error signals for each polarization and compute respective DC bias set points of the corresponding in-phase child MZM, quadrature-phase child MZM, and parent MZM for each polarization.

Figure 4:
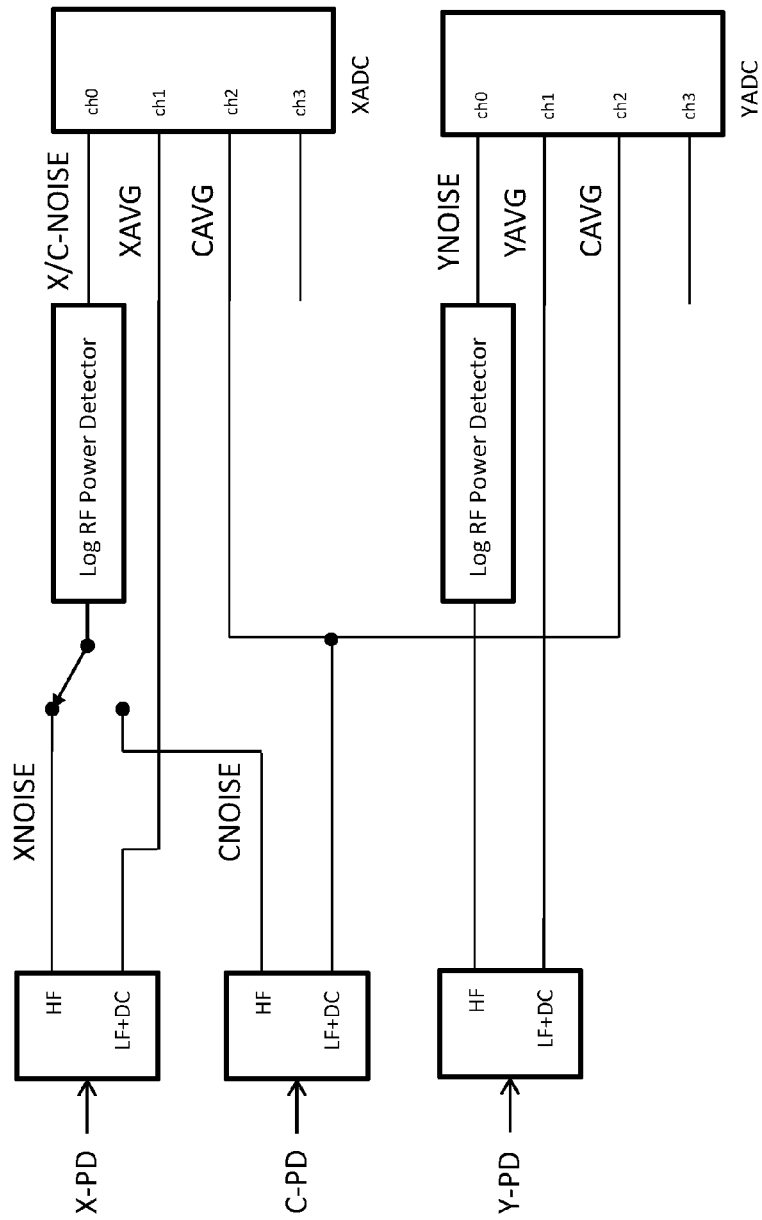
FIG. 4 shows a block diagram of example hardware that detects interference terms.

FIG. 4 shows a block diagram of example hardware that detects interference terms, arranged in accordance with at least one embodiment described herein. The hardware of FIG. 4 may include or correspond to the digital processors 104, 104' of FIG. 1. In an example embodiment, "X-PD" in FIG. 4 includes a digitized representation of the output of the first optical detector 142 as output by the ADC 105 of FIG. 1, "C-PD" in FIG. 4 includes a digitized representation of the output of the third photodetector 146 as output by the ADC 107 of FIG. 1, and "Y-PD" in FIG. 4 includes a digitized representation of the output of the second photodetector 144 as output by the ADC 105' of FIG. 1.

Figure 5:
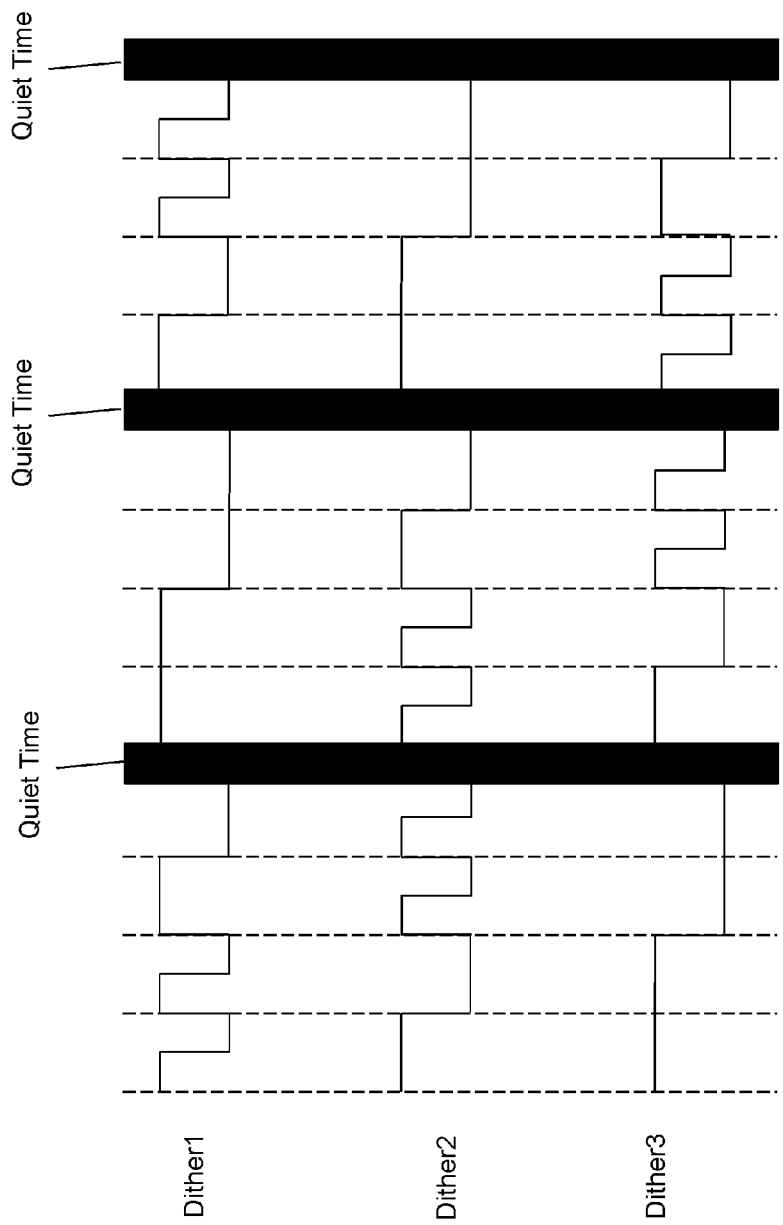
FIG. 5 shows another set of example dither patterns that may be implemented in the dual-polarization IQM of FIG. 1, all arranged in accordance with at least some embodiments described herein.

FIG. 5 shows another set of example dither patterns that are mutually orthogonal in the frequency domain and that may be implemented in the dual-polarization IQM 102 of FIG. 1, arranged in accordance with at least one embodiment described herein. For instance, a first dither pattern Dither1 may be implemented in the first-in-time half of the first in-phase dither pattern or in the second-in-time half of the second in-phase dither pattern of FIG. 2. Alternatively or additionally, a second dither pattern Dither2 may be implemented in the first-in-time half of the first quadrature dither pattern or in the second-in-time half of the second quadrature dither pattern of FIG. 2. Alternatively or additionally, a third dither pattern Dither3 may be implemented in the first-in-time half of the first parent dither pattern or in the second-in-time half of the second parent dither pattern of FIG. 2.

The three dither patterns of FIG. 5 may respectively be applied to an in-phase child MZM, a corresponding quadrature-phase child MZM, and a corresponding parent MZM. In FIG. 5, vertical dashed lines are provided to indicate time intervals of equal or substantially equal length. E.g., a length of time between two adjacent vertical dashed lines is one time interval. Vertical solid bars are referred to herein as a "quiet time." It can be seen from FIG. 5 that for each time interval, only one of the phase ports (e.g., in-phase child, quadrature-phase child, parent) is dithered. According to the embodiment of FIG. 5, for each time window, an error signal is measured; after four time intervals, a corresponding DAC may be updated to compensate for measured error during the "quiet time," and then the process is repeated. It can be seen from FIG. 5 that the pattern alternates between the in-phase port, the quadrature-phase port, and the parent phase port.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of automatic bias stabilization, the method comprising:
   simultaneously dithering DC-bias voltage of each of an X polarization in-phase child Mach-Zehnder modulator (MZM), an X polarization quadrature-phase child MZM, and an X polarization parent MZM included in an X polarization arm of a dual-polarization in-phase and quadrature optical modulator (IQM) according to three first dither patterns that are different from each other;
   detecting, at a first tap monitor photodiode coupled to an output of the X polarization arm, an X polarization interference term between the three first dither patterns;
   sampling an output of the first tap monitor photodiode to generate an X polarization interference signal indicative of the X polarization interference term;
   calculating an in-phase child MZM error signal, based on the interference signal between a quadrature-phase child MZM error signal and an X polarization parent MZM error signal;
   updating an in-phase child MZM DC-bias set point to minimize the in-phase child MZM error signal;
   calculating the quadrature-phase child MZM error signal, based on the interference signal between the in-phase child MZM error signal and the X polarization parent MZM error signal;
   updating a quadrature-phase child MZM DC-bias set point to minimize the quadrature-phase child MZ error signal;
   calculating the X polarization parent MZM error signal, based on the interference signal between the in-phase child MZM error signal and the quadrature-phase child MZM error signal; and
   updating a parent MZM DC-bias set point to minimize the X polarization parent MZM error signal.

2. The method of claim 1, wherein the three first dither patterns are mutually orthogonal in a frequency domain.

3. The method of claim 1, wherein each of the in-phase child MZM DC-bias set point, the quadrature-phase child MZM DC-bias set point, and the parent MZM DC-bias set point is applied to the corresponding X polarization in-phase child MZM, the X polarization quadrature-phase child MZM, and the X polarization parent MZM by a corresponding 16-bit DAC.

4. The method of claim 1, wherein the sampling comprises sampling with a high resolution analog-to-digital converter (ADC) sampling at a frequency of about 5-1000 hertz (Hz).

5. The method of claim 4, wherein the high resolution ADC comprises a 24-bit delta-sigma ADC and the frequency comprises about 10 Hz.

6. The method of claim 1, wherein the calculating the in-phase child MZM DC-bias set point, the quadrature child MZM DC-bias set point, and the parent MZM DC-bias set point comprises calculating the in-phase child MZM DC-bias set point, the quadrature child MZM DC-bias set point, and the parent MZM DC-bias set point using a digital proportional and integral controller that receives the in-phase child MZM error signal, the quadrature child MZM error signal, and the x polarization parent MZM error signal as input.

7. The method of claim 1, further comprising:
   simultaneously dithering DC-bias voltage of each of a Y polarization in-phase child Mach-Zehnder modulator (MZM), a Y polarization quadrature-phase child MZM, and a Y polarization parent MZM included in a Y polarization arm of a dual-polarization in-phase and quadrature optical modulator (IQM) according to three second dither patterns that are different from each other;
   detecting, at a second tap monitor photodiode coupled to an output of the Y polarization arm, a Y polarization interference term between the three second dither patterns;
   sampling an output of the second tap monitor photodiode to generate a Y polarization interference signal indicative of the Y polarization interference term;

calculating a second in-phase child MZM error signal, based on the interference signal between a second quadrature-phase child MZM error signal and a Y polarization parent MZM error signal;

updating a second in-phase child MZM DC-bias set point to minimize the second in-phase child MZ error signal;

calculating the second quadrature-phase child MZM error signal, based on the interference signal between the second in-phase child MZM error signal and the Y polarization parent MZM error signal;

updating a second quadrature-phase child MZM DC-bias set point to minimize the second quadrature-phase child MZ error signal;

calculating the Y polarization parent MZM error signal, based on the interference signal between the second in-phase child MZM error signal and the second quadrature-phase child MZM error signal; and updating a second parent MZM DC-bias set point to minimize the Y polarization parent MZM error signal.

8. The method of claim 1, wherein the three first dither patterns are constructed such that during each of multiple sequential time intervals, only one pilot tone is applied.

9. The method of claim 1, wherein the dual-polarization IQM modulator is implemented within a CFP pluggable transceiver, a CFP2 pluggable transceiver, or a CFP4 pluggable transceiver.

10. The method of claim 1, wherein the dual-polarization IQM modulator is implemented within an optical internetworking forum (OIF) type module.

11. The method of claim 1, wherein the dual-polarization IQM modulator is implemented using a lithium niobate (LN) modulator, an indium phosphide (InP) modulator, or silicon phosphide (SiP) modulator.

12. The method of claim 1, wherein the dual-polarization IQM modulator is used to transmit a single or dual polarization multi-level modulation format.

13. The method of claim 12, wherein the single or dual polarization multi-level modulation format comprises binary phase shift keying (BPSK), quadrature phase shift keying (QPSK), 8QAM, or 16QAM.

14. A communication module, comprising:
an X polarization in-phase child Mach-Zehnder modulator (MZM);
an X polarization quadrature-phase child MZM;
an X polarization parent MZM included in an X polarization arm of a dual-polarization in-phase and quadrature optical modulator (IQM);
a first bias control circuit configured to simultaneously dither DC-bias voltage of each of the X polarization in-phase child MZM, the X polarization quadrature-phase child MZM, and the X polarization parent MZM according to three first dither patterns that are different from each other;
a first tap monitor photodiode coupled to an output of the X polarization arm and configured to detect an X polarization interference term between the three first dither patterns;
a first analog to digital converter (ADC) coupled to the first tap monitor photodiode and configured to sample an output of the first tap monitor photodiode to generate an X polarization interference signal indicative of the X polarization interference term;
wherein the first bias control circuit is configured to:
calculate an in-phase child MZM error signal, based on the interference signal between a quadrature-phase child MZM error signal and an X polarization parent MZM error signal;
update an in-phase child MZM DC-bias set point to minimize the in-phase child MZM error signal;
calculate the quadrature-phase child MZM error signal, based on the interference signal between the in-phase child MZM error signal and the X polarization parent MZM error signal;
update a quadrature-phase child MZM DC-bias set point to minimize the quadrature-phase child MZ error signal;
calculate the X polarization parent MZM error signal, based on the interference signal between the in-phase child MZM error signal and the quadrature-phase child MZM error signal; and
update a parent MZM DC-bias set point to minimize the X polarization parent MZM error signal.

15. The communication module of claim 14, wherein the three first dither patterns are mutually orthogonal in a frequency domain.

16. The communication module of claim 14, further comprising a first, second, and third 16-bit digital to analog converter (DAC) respectively coupled between the bias control circuit and the X polarization in-phase child MZM, the X polarization quadrature-phase child MZM, and the X polarization parent MZM, wherein each of the in-phase child MZM DC-bias set point, the quadrature-phase child MZM DC-bias set point, and the parent MZM DC-bias set point is applied to the X polarization in-phase child MZM, the X polarization quadrature-phase child MZM, and the X polarization parent MZM by the corresponding first, second, or third 16-bit DAC.

17. The communication module of claim 14, wherein the first ADC comprises a 24-bit delta-sigma ADC.

18. The communication module of claim 14, further comprising:
a Y polarization in-phase child MZM;
a Y polarization quadrature-phase child MZM;
a Y polarization parent MZM included in a Y polarization arm of the dual-polarization IQM;
a second bias control circuit configured to simultaneously dither DC-bias voltage of each of the Y polarization in-phase child MZM, the Y polarization quadrature-phase child MZM, and the Y polarization parent MZM according to three second dither patterns that are different from each other;
a second tap monitor photodiode coupled to an output of the Y polarization arm and configured to detect a Y polarization interference term between the three second dither patterns;
a second ADC coupled to the second tap monitor photodiode and configured to sample an output of the second tap monitor photodiode to generate a Y polarization interference signal indicative of the Y polarization interference term;
wherein the second bias control circuit is configured to:
calculate a second in-phase child MZM error signal, based on the interference signal between a second quadrature-phase child MZM error signal and a Y polarization parent MZM error signal;
update a second in-phase child MZM DC-bias set point to minimize the second in-phase child MZ error signal;
calculate the second quadrature-phase child MZM error signal, based on the interference signal between the second in-phase child MZM error signal and the Y polarization parent MZM error signal;

update a second quadrature-phase child MZM DC-bias set point to minimize the second quadrature-phase child MZ error signal;

calculate the Y polarization parent MZM error signal, based on the interference signal between the second in-phase child MZM error signal and the second quadrature-phase child MZM error signal; and update a second parent MZM DC-bias set point to minimize the Y polarization parent MZM error signal.

19. The communication module of claim 14, wherein communication module comprises a CFP pluggable transceiver, a CFP2 pluggable transceiver, or a CFP4 pluggable transceiver.

20. The communication module of claim 14, wherein the dual-polarization IQM modulator is implemented using a lithium niobate (LN) modulator, an indium phosphide (InP) modulator, or silicon phosphide (SiP) modulator.

* * * * *